REEL SUPPORT

Filed Dec. 3, 1965

INVENTORS.
JOSEPH H. LANCOR, JR.
PATRICK J. CUNNINGHAM
BY
Christie, Parker & Hale
ATTORNEYS.

United States Patent Office 3,401,897
Patented Sept. 17, 1968

3,401,897
REEL SUPPORT

Joseph H. Lancor, Jr., Arcadia, and Patrick J. Cunningham, Fullerton, Calif., assignors to Consolidated Electrodynamics Corporation, Pasadena, Calif., a corporation of California Filed Dec. 3, 1965, Ser. No. 511,489
4 Claims. (Cl. 242—55.11)

ABSTRACT OF THE DISCLOSURE

A support for mounting oversize film reels. The support includes a shaft for receiving a reel provided with a mounting aperture of standard size. In addition, a reel support pedestal is provided on the shaft at an axial position between the support and the reel location. Thrust bearings are provided in the support at a location radially spaced from the shaft such that the thrust bearings contact the interior side of the film reel pedestal.

Figures 1, 2, 3, 4:
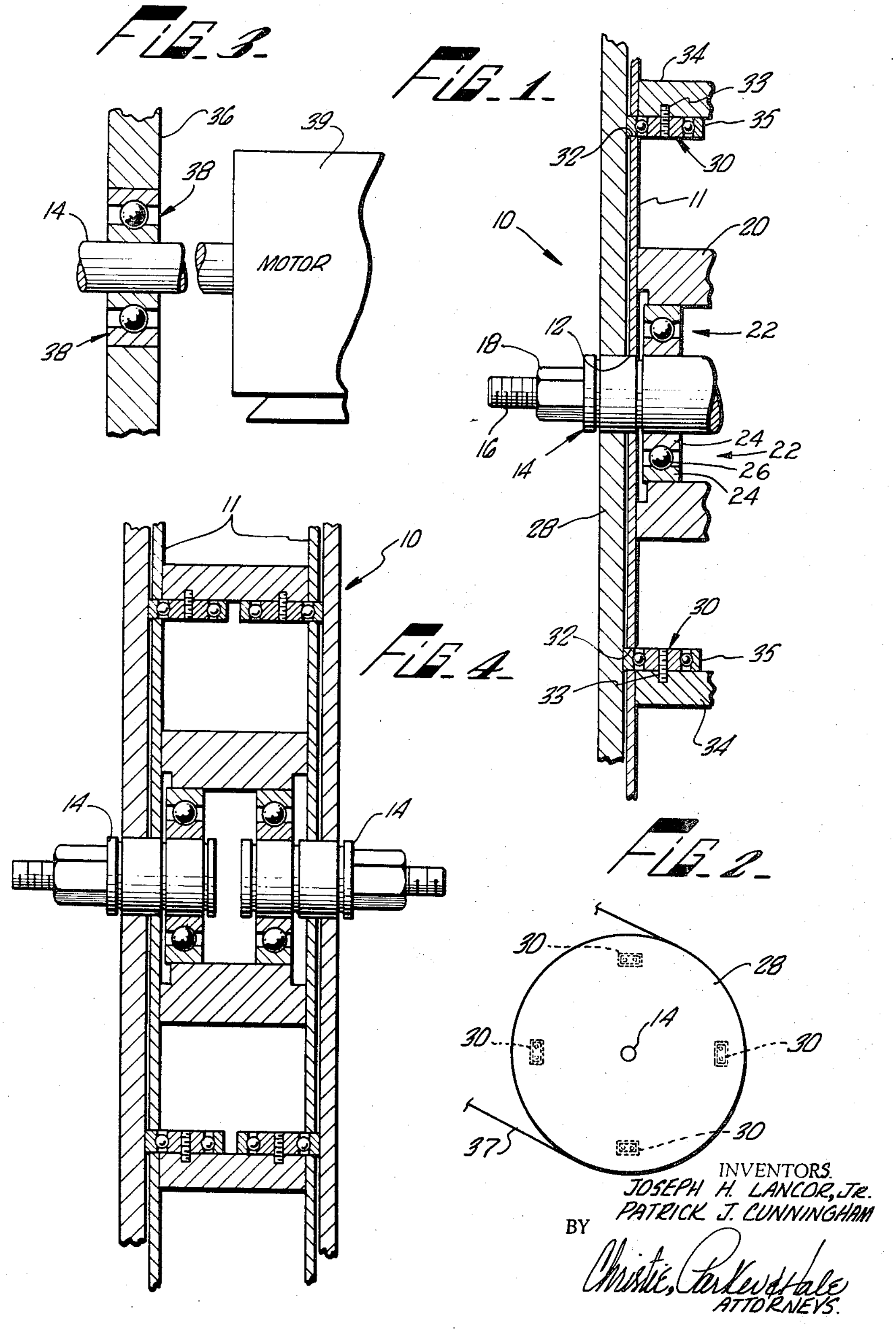

This invention relates to mountings for motion picture film reels and in particular to reel mountings for use in film magazines or cassettes.

In certain custom designed motion picture entertainment systems such as those currently in use in airplanes, it is customary to use oversize film reels (18 to 28 inches in diameter) in lieu of the more conventional 14 and 16-inch reels in order to eliminate the necessity of changing reels during the course of showing a full length feature film. A 28-inch reel is capable of holding four hours of filmed material.

One obvious concomitant of such a design is a substantial increase in the amount of weight to be supported by the shaft on which the reel is mounted. This increase in weight is further accentuated by the environment in which the entertainment system is located, viz., an aircraft which can be subject to severe inertial forces while in flight. Of necessity, steps must be taken to prevent a fully loaded oversize reel from being torn loose from its mounting when subjected to such forces.

One approach has been to provide reels having oversize mounting apertures in the center of the reel to accommodate a mounting shaft on the order of 3 inches in diameter. Providing a shaft of this size gives reasonable assurance that the possible gyrations and inertial forces to which the aircraft may be subjected will not affect the presentation nor permit the reel to tear loose from its moorings. Such a reel, however, does entail use of a specially constructed shaft and reel and provides support for the reel only at its center. In addition the enlarged and strengthened reel hub means a reduction in film carrying capacity for a reel of given diameter.

The present invention relates to a reel mounting which is capable of accepting reels of various diameter sizes having standard $\frac{5}{16}$ inch center mounting holes. Such a mounting is readily adaptable for use in moving vehicles, as for example, aircraft and is capable of withstanding approximately 12 "*g*'s" with a fully loaded 28-inch reel without experiencing malfunction or detachment of the reel from its mounting.

The invention provides a mounting comprising a support and a shaft journalled in the support by suitable bearing means. A portion of the shaft is adapted to receive a motion picture film reel. A reel pedestal is mounted in the shaft interiorly of the reel-receiving portion and the mounting is completed by the provision of thrust bearings mounted on the support in contact with the pedestal.

In a copending application Ser. No. 485,768, filed Sept. 8, 1965, in the name of Joseph H. Lancor, Jr., now U.S. Patent No. 3,379,488, and assigned to the same assignee as the present application, a new motion picture entertainment system is described in which the film supply and takeup reels are remotely located from some or all of a plurality of motion picture projectors. In one embodiment these reels are coaxially mounted in a film magazine or cassette which is connected by suitable duct or conduit to the first and last projectors in the system.

The present invention is particularly suited for use in such a system. The support of this invention corresponds to an interior wall of the magazine or cassette. A standard rotatable film reel shaft extends from within the wall providing a situs for mounting a supply reel. A similar arrangement is mounted opposite the supply reel side providing a mounting for a takeup reel. The walls of the two sides are joined such that the shafts are coaxially located approximately in the center of the cassette. A reel pedestal which also serves as a pulley is affixed to each shaft between the reel mounting portions of the shafts and the interior walls of the cassette. Four thrust bearings for each pedestal are spaced at 90° intervals. The thrust bearings provide support for a film reel over a wide area enabling the assembly to sustain high inertial forces using reels with standard mounting apertures. In the preferred embodiment the exterior ends of the shafts are threaded for locking the reels on the shafts.

These and other features of the invention will be further apparent by reference to the following figures in which:

FIG. 1 is a detailed sectional view of the reel pedestal of this invention showing mounting of a preferred embodiment, FIG. 2 is an elevational view of the reel pedestal illustrating the location of the four thrust bearings of the preferred embodiment, FIG. 3 is a simplified diagrammatic illustration of the mounting of this invention showing an alternate means of driving the shaft, and FIG. 4 is a sectional view similar to FIG. 1 showing a film magazine utilizing two of the reel mountings of this invention.

Referring now to FIG. 1, there is shown therein a filament reel mounting 10 including a support plate 11. An aperture 12 is provided approximately in the center of the support plate 11 and a shaft 14 is located in the aperture. The shaft 14 has a threaded portion 16 located at one end of the shaft. The side of support 11 adjacent threaded portion 16 will be referred to herein as the exterior side of the support and the opposite side of the support, the interior side. A second portion 18 of the shaft located intermediate threaded portion 16 and support 11 is adapted to mate with the $\frac{5}{16}$ inch square standard reel mounting aperture.

A hub 20 located interiorly of support 11 is mounted on the support concentrically with aperture 12. Provided between the hub 20 and shaft 14 are bearing means 22 comprising a pair of races 24 and ball bearings 26. The first race is attached to the shaft 14 and the second race is attached to the interior periphery of the hub 20. The ball bearings 26 are located within the races for providing rotatable support of the shaft.

A reel pedestal 28 is mounted on the shaft between the reel-receiving portion 18 and the support 11. The pedestal is locked to the shaft and rotates with it. The pedestal is preferably a flat plate adapted to abut a film reel mounted on the reel-receiving portion 18 of the shaft 14. As indicated in more detail below, in one embodiment the pedestal is a circular plate or disc which serves the dual function of a pedestal and a pulley.

A plurality of thrust bearing 30 are mounted interiorly of support 11 at locations spaced from aperture 12. The thrust bearings are supported by bearing mountings 34 along an axis 33 and extend through apertures 32 in support 11 such that they contact the interior side of pedestal 28. Each thrust bearing has a race 35 which is arranged to rotate about an axis transverse to the axis of rotation of the shaft to provide points of support for the reel pedestal and a reel which may be mounted on the pedestal in addition to the normal support provided by the shaft on which the reel is mounted.

One method of driving the pedestal 28 and shaft 14 is to provide a belt around the pedestal 28 making the pedestal serve as a pulley. Such an arrangement is shown in FIG. 2 wherein a portion of a belt 37 extending away from the pulley 28 toward a drive pulley (not shown) is illustrated therein. FIG. 2 also better illustrates the preferred embodiment of the pedestal and the disposition of the thrust bearings for supporting the pedestal. As shown in that figure, four thrust bearings 30 are provided at 90° intervals around the circumference of the pedestal.

As an alternate means driving pedestal 28 a motor 39 which can be attached to shaft 14 directly or by suitable gearing means (not shown) can be provided interiorly of the reel mounting portion of the shaft as shown in FIG. 3. In that figure the shaft 14 is mounted in a support 36 which may be part of a hub and is provided with ball bearings 38 to provide rotational support of the shaft relative to the hub or support 36.

In the film magazine apparatus referred to above a second reel mounting 10 similar in all respects to that shown in FIG. 1 is provided adjacent to a first mounting as shown in FIG. 1. The second mounting is arranged with its reel mounting shaft extending in the opposite direction. Because of the similarity to the support shown in FIG. 1, the various parts of the structure of FIG. 4 will be referred to by the same designations as used in FIG. 1. In such an embodiment the two supports 11 define a web having two shafts 14 extending in opposite directions from each side of the web. Such an assembly is then ready for installation of a loaded supply reel and an empty takeup reel preparatory to attachment of a retained trailer as described in above-mentioned copending application to each of the reels.

In summary the present invention provides a support or mounting for filament reels such as motion picture film reels. The mounting is capable of supporting fully loaded film reels up to 28 inches in diameter. It is further characterized by a capability of accepting such reels regardless of their diameter size on a standard 5/16 inch reel mounting shaft while at the same time providing support for the reel over a wide area by means of a reel pedestal and thrust bearing combination. Operation of a motion picture film system in which such a mounting is used is unaffected by the gyrations of a moving vehicle such as an aircraft. Furthermore the reel can be secured such that it is anchored in position during system operation and is capable of withstanding extremely high inertial forces without danger of coming loose from its moorings.

We claim:

1. A mounting for a motion picture film reel comprising:
- a frame,
- a hub mounted on the frame, the hub and frame defining a shaft location,
- first bearing means mounted interiorly of the hub,
- a shaft journalled in the first bearing means, the shaft having a reel-receiving portion located exteriorly of the frame,

- a reel pulley mounted on the shaft between the frame and reel-receiving portion of the shaft,
- a plurality of second bearing means disposed along the periphery of the reel pulley,
- means for mounting each of the second bearing means, the mounting means being located interiorly of the frame,
- an aperture in the frame for each of the plurality of second bearing means, the bearing mounting means, aperture and second bearing means being arranged such that the second bearing means contact and support the reel pulley,
- means for securing a reel to the shaft, and
- a drive belt disposed in contact with the periphery of the pulley for rotating the shaft.

2. A mounting according to claim 1 wherein the plurality of second bearing means comprises four thrust bearings disposed along the periphery of the reel pulley at 90° intervals.

3. A structure for rotatably mounting and locking a pair of oversize motion picture film reels comprising:
- a frame;
- a pair of shafts coaxially mounted on opposite sides of the frame;
- a pair of first bearing means mounted interiorly of the frame, said bearing means journalling each of said shafts in said frame, the shafts having reel-receiving portions extending in opposite directions exteriorly of the frame;
- a reel pedestal mounted on each of the shafts between the frame and reel-receiving portion of the shaft;
- a plurality of second bearing means radially spaced from said shafts adjacent the periphery of the reel pedestal;
- mounting means for securing said second bearing means to the frame;
- an aperture in the frame for each of the plurality of second bearing means, the mounting means, aperture and second bearing means being arranged such that the second bearing means contact and rotatably support the reel pedestals;
- locking means provided on the shafts for securing the reels to the shafts; and
- means connected to said shafts for communicating rotational motion thereto.

4. A mounting according to claim 3 wherein the plurality of second bearing means comprises four thrust bearings disposed around the periphery of the reel pulley at 90° intervals.

References Cited

UNITED STATES PATENTS

| | | | |
|---|---|---|---|
| 1,300,655 | 4/1919 | Rubenstein | 242—61 |
| 1,377,112 | 5/1921 | Boylan | 242—55.14 |
| 1,775,610 | 9/1930 | Weiss | 242—68.3 |
| 1,945,621 | 2/1934 | Shaw. | |

FOREIGN PATENTS

| | | |
|---|---|---|
| 1,126,629 | 7/1956 | France. |
| 465,304 | 5/1937 | Great Britain. |

GEORGE F. MAUTZ, *Primary Examiner.*